(12) United States Patent
Masuda

(10) Patent No.: US 6,753,765 B2
(45) Date of Patent: Jun. 22, 2004

(54) REAR DIRECTION MONITORING APPARATUS FOR VEHICLE

(75) Inventor: Harumasa Masuda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/366,613

(22) Filed: Feb. 14, 2003

(65) Prior Publication Data
US 2003/0156020 A1 Aug. 21, 2003

(30) Foreign Application Priority Data
Feb. 18, 2002 (JP) ........................................ 2002-039795

(51) Int. Cl.$^7$ ................................................ B60Q 1/00
(52) U.S. Cl. ...................... 340/435; 340/436; 340/903; 180/167; 307/10.6; 367/909
(58) Field of Search ................................. 340/435, 436, 340/903, 686.6, 573.4; 180/167, 169; 307/10.3, 10.6; 367/909, 93, 87, 130

(56) References Cited

U.S. PATENT DOCUMENTS

| | | | | |
|---|---|---|---|---|
| 4,404,541 A | * | 9/1983 | Kodera et al. | 367/909 |
| 4,779,095 A | * | 10/1988 | Guerreri | 340/904 |
| 5,173,881 A | * | 12/1992 | Sindle | 367/909 |
| 6,114,950 A | * | 9/2000 | Schaible et al. | 340/435 |

FOREIGN PATENT DOCUMENTS

JP    2000-177513    6/2000

\* cited by examiner

*Primary Examiner*—Donnie L. Crosland
(74) *Attorney, Agent, or Firm*—McGinn & Gibb, PLLC

(57) ABSTRACT

When an electronic control unit (ECU) detects that an ignition key is turned to an accessory-on position, it is monitored whether or not an object exists in the vicinity of an exhaust tail pipe. In case where the object is detected in the vicinity of the exhaust tail pipe, a warning is raised inside and outside of a vehicle. At the same time, when it is detected that the ignition key is turned to an engine starting position, the ECU inhibits starting the engine of the vehicle for safty.

7 Claims, 3 Drawing Sheets

REAR DIRECTION MONITORING APPARATUS FOR VEHICLE

BACKGROUND OF THE INVENTION

1. Field of the invention

The present invention relates to a rear direction monitoring apparatus of a vehicle for monitoring a man or an object existing in the vicinity of an exhaust tail pipe disposed at the rear part of the vehicle.

2. Discussion of related arts

Japanese Patent Application Laid-open No. Toku-Kai 2000-177513 discloses a reverse drive assist apparatus for detecting an obstacle at the rear of a vehicle based on an image of a rear field taken by a monitoring camera and for raising an alarm by sound to a vehicle driver.

In the aforesaid reverse drive assist apparatus, depending upon the position where the camera is located, it is difficult to recognize an existence of an infant, a man riding a wheelchair, a man of short stature or an object of a small height. Further, according to the aforesaid reverse drive assist apparatus, a detection of the obstacle is available only when a vehicle travels in reverse or when a shift lever is in a reverse position.

Accordingly, when an engine starts, the man or the object existing at the rear of the vehicle cannot be detected. As a result, exhaust gases blow against the infant or the man riding on the wheelchair. If the object existing at the rear of the vehicle is a flammable one, there is possibility of an occurrence of fire.

SUMMARY OF THE INVENTION

It is an object of the present invention to provide a rear direction monitoring apparatus capable of raising an alarm or inhibiting starting an engine when it is detected that a man or an object exists in the vicinity of an exhaust tail pipe.

To attain the object, the rear direction monitoring apparatus comprises first detecting means for detecting that an ignition key is switched to an accessory-on position, second detecting means for detecting whether or not the object exists in the vicinity of an exhaust tail pipe when the first detecting means detects that the ignition key is switched to accessory-on position, and first warning means for raising an alarm to a driver when the second detecting means detects that the object exists in the vicinity of the exhaust tail pipe.

The rear direction monitoring apparatus further comprises second warning means for raising the alarm at the rear part of the vehicle when the second detecting means detects that the object exists in the vicinity of the exhaust tail pipe. Further, for safety, the rear direction monitoring apparatus includes third detecting means for detecting that the ignition key is turned on when the second detecting means detects that the object exists in the vicinity of the exhaust tail pipe and engine starting inhibiting means for inhibiting starting an engine when the third detecting means detects that the ignition key is turned on.

DESCRIPTION OF PREFERRED EMBODIMENTS

Figure 1:
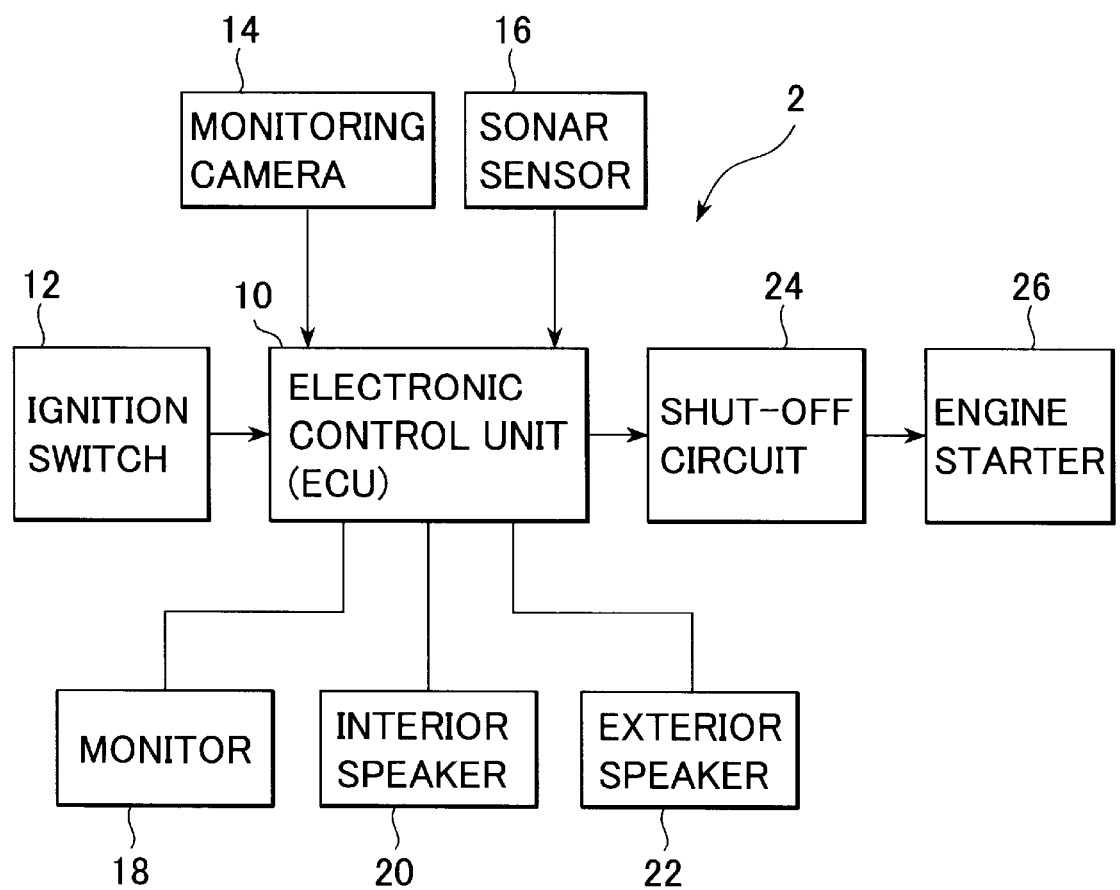
FIG. 1 is a block diagram of a rear direction monitoring apparatus for a vehicle according to an embodiment of the present invention.

Referring now to FIG. 1, a vehicular rear direction monitoring apparatus 2 includes an electronic control unit (ECU) 10. The ECU 10 is connected with an ignition switch 12, a monitoring camera 14 and a sonar sensor 16 and inputs a signal indicative of a switching position of the ignition switch 12, image data taken by the monitoring camera 14 and a result of detection by the sonar sensor 16.

Further, the ECU 10 is connected with a monitor 18, an interior speaker 20 and an exterior speaker 22 and outputs image data taken by the monitoring camera 14 to the monitor 18 and sound data for warning by the interior speaker 20 and the exterior speaker 22.

Furthermore, the ECU 10 is connected with an engine starter 26 through a shut-off circuit 24 and outputs a control signal to start the engine to the engine starter 26 through the shut-off circuit 24.

Figure 2:
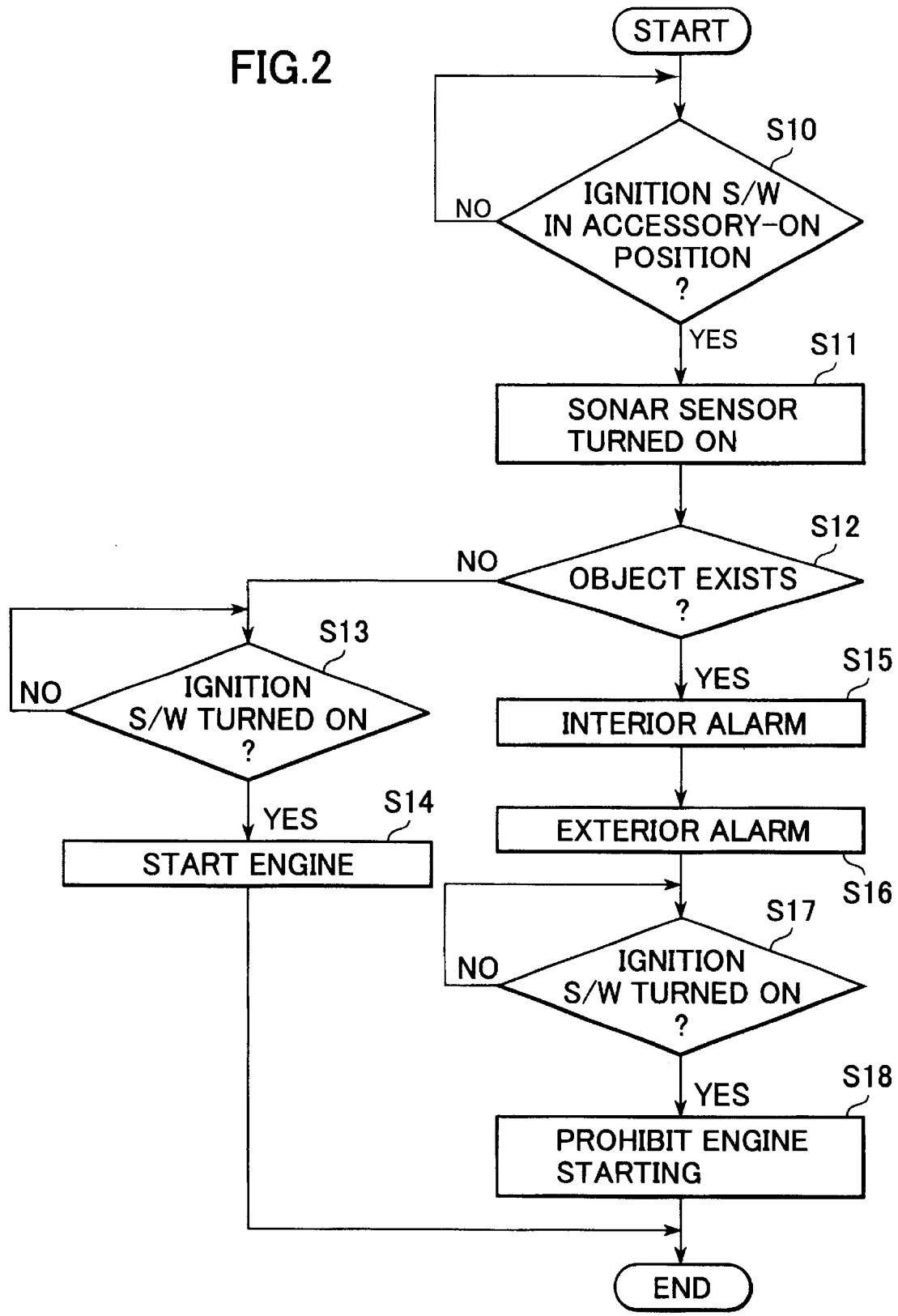
FIG. 2 is a flowchart showing a control process of the rear direction monitoring apparatus for the vehicle according to another embodiment of the present invention.
Figure 3:
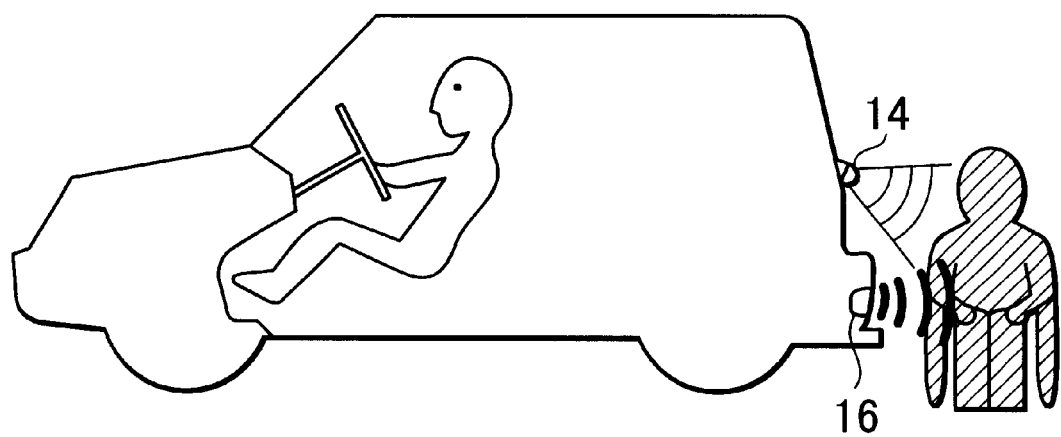
FIG. 3 is an explanatory view showing a state of detecting an obstacle at the rear of the vehicle by the rear direction monitoring apparatus for the vehicle according to the other embodiment of the present invention.

Referring to FIG. 2, a flow of control of the vehicular rear obstacle monitoring apparatus according to the embodiment will be described. First, at a step S10 when it is detected that the ignition switch 12 is set in an accessory-on position, at a step S11 the sonar sensor 16 incorporated in the rear part of the vehicle is turned on to start the detection of an existence of an object in the vicinity of the exhaust tail pipe. Then, the monitoring camera 14 installed on the rear part of the vehicle is energized and takes the image data in the vicinity of the exhaust tail pipe. The image data is displayed on the monitor 18 installed on a dashboard in front of a driver.

At a step S12, in case where the sonar sensor 16 detects no object in the vicinity of the exhaust tail pipe of a rear side of the vehicle, the program goes to a step S13 where it is detected that the ignition switch 12 is turned on and then at a step S14, a control signal is outputted to the engine starter 26 through the shut-off circuit 24 to start the engine.

On the other hand, at the step S12, in case where the sonar sensor 16 detects an object in the vicinity of the exhaust tail pipe, the program goes to a step S15 where an interior alarm is raised and then goes to a step S16 where an exterior alarm is raised. With respect to the interior alarm, a message that the object exists in the vicinity of the exhaust tail pipe is issued by an interior speaker 20 and with respect to the exterior alarm, the message that the engine will start is issued through the exterior speaker 22 provided at the rear part of the vehicle. The interior alarm may be raised by a buzzer or a lamp disposed in the passenger compartment and the exterior alarm may be issued by the buzzer provided outside of the vehicle.

After the interior alarm and the exterior alarm are raised, when it is at a step S17 detected that the ignition switch 12 is turned on, at a step S18 the shut-off circuit 24 shuts off the control signal for starting the engine to inhibit the engine starting.

When an infant, a man riding a wheelchair and the like exist in the vicinity of the exhaust tail pipe at the rear part of the vehicle, the rear direction monitoring apparatus according to the present invention prevents exhaust gases from blowing against these men. Further, the exterior alarm at the rear part of the vehicle gives them a warning to leave the vicinity of the exhaust tail pipe.

Further, when the vehicle parks in the vicinity of other vehicles or wall surfaces of parking lots, canceling means for canceling the execution of the program and for forcedly enabling the engine starting may be provided.

The entire contents of Japanese Patent Application No. Tokugan 2002-039795 filed Feb. 18, 2002, is incorporated herein by reference.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A monitoring apparatus for a vehicle, comprising:
   first detecting means for detecting that an ignition key is in an accessory-on position;
   second detecting means for detecting whether or not an object exists in the vicinity of an exhaust tail pipe when said first detecting means detects that said ignition key is at said accessory-on position; and
   first alarm means for raising an alarm to a vehicle driver when said second detecting means detects that an object exists in the vicinity of said exhaust tail pipe.

2. The monitoring apparatus according to claim 1, further comprising:
   second alarm means for raising said alarm at the rear part of said vehicle when said second detecting means detects that said object exists in the vicinity of said exhaust tail pipe.

3. The monitoring apparatus according to claim 1, further comprising:
   third detecting means for detecting that said ignition key is turned on when said second detecting means detects that said object exists in the vicinity of said exhaust tail pipe; and
   engine starting inhibiting means for inhibiting starting an engine when said third detecting means detects that said ignition key is turned on.

4. The monitoring apparatus of claim 1, further comprising canceling means for canceling an execution of a program so as to forcedly enable an engine starting.

5. The monitoring apparatus of claim 1, wherein said second detecting means comprises a monitoring camera.

6. The monitoring apparatus of claim 1, wherein said second detecting means comprises a sonar sensor.

7. The monitoring apparatus of claim 1, wherein said second detecting means is at a rear of a vehicle.

* * * * *